Sept. 27, 1949.                F. E. BACHMAN                 2,483,172
                                SPRING GROUP
Filed Sept. 14, 1945                                      2 Sheets-Sheet 1
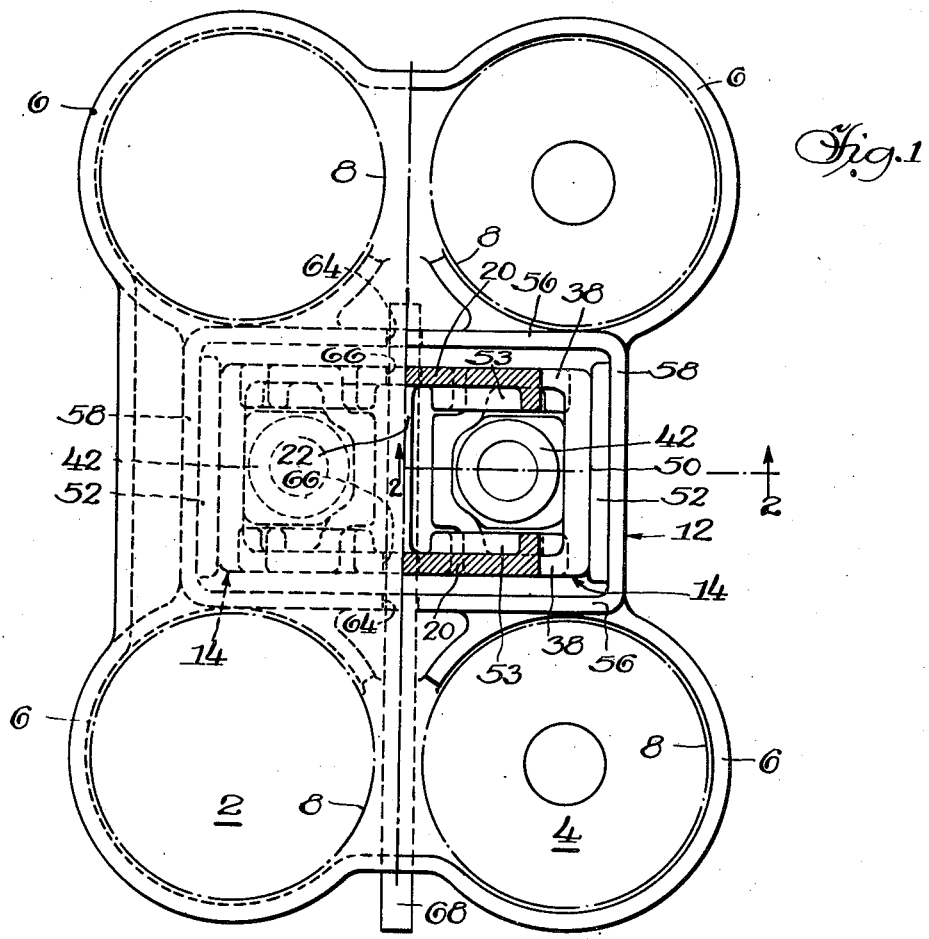
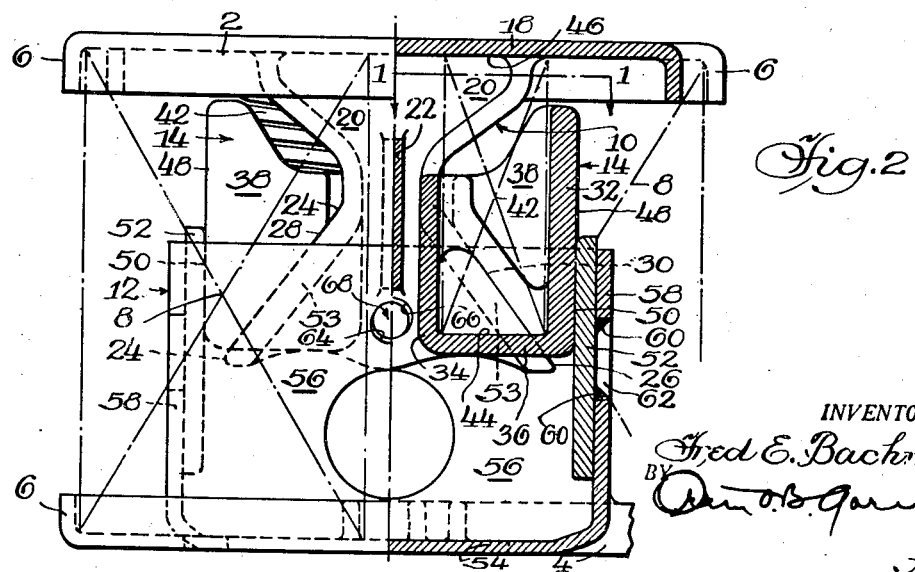
INVENTOR.
Fred E. Bachman
BY
Atty Sept. 27, 1949. F. E. BACHMAN 2,483,172
SPRING GROUP
Filed Sept. 14, 1945 2 Sheets-Sheet 2

INVENTOR.
Fred E. Bachman
BY
Atty.

Patented Sept. 27, 1949

2,483,172

UNITED STATES PATENT OFFICE 2,483,172

SPRING GROUP

Fred E. Bachman, Chicago, Ill., assignor to American Steel Foundries, Chicago, Ill., a corporation of New Jersey Application September 14, 1945, Serial No. 616,267

5 Claims. (Cl. 267—9)

1

My invention relates to spring groups as usually utilized in railway car trucks and more particularly to such a structure wherein a plurality of coil springs may be utilized in conjunction with a friction device for controlling oscillations of the springs, such a device being sometimes designated a ride control unit.

The general object of my invention is to devise a spring group incorporating a friction device capable of developing substantially constant friction for controlling the oscillations of the coil springs.

Another object of my invention is to devise a spring group wherein the ride control unit comprises telescoping followers associated with respective spring plates confining the unit and the coil springs therebetween, one of said followers having wedge surfaces and the other of said followers having friction surfaces at corresponding opposite ends thereof, a friction shoe being engaged with the wedge surfaces and friction surface at each end of the followers, and a vertically acting resilient member associated with each shoe for operatively urging the same into said engagement.

A specific object of my invention is to devise a ride control unit in which top and bottom followers are associated with top and bottom spring plates of a bolster-supporting coil spring group, said followers being in telescoping relation with spaced friction faces on said bottom follower at opposite ends thereof and spaced wedge surfaces on the top follower adjacent and sloping toward each friction surface and receiving therebetween a friction shoe in complementary engagement therewith and the adjacent friction surface, the shoes housing resilient means bearing thereagainst and the top follower for urging the shoes into engagement with the surfaces on both followers in such manner as to afford substantially constant frictional control of the coil springs.

My invention comprehends a wedge follower of novel form comprising a top wall and substantially parallel side walls merging therewith and providing a pair of coplanar wedge surfaces at corresponding ends thereof, said pairs of surfaces converging toward said top wall, the surfaces of each pair receiving a friction shoe therebetween for engagement therewith, and said top wall providing a spring seat above each pair of surfaces for seating an associated coil spring extending between the surfaces of said pair for engagement with said shoe.

2

In the drawings:

Figure 1 is a top plan view of a spring group embodying my invention, partly in section, said section being taken substantially in the horizontal plane indicated by the line 1—1 of Figure 2;

Figure 2 is an end view, partly in section, of the structure shown in Figure 1, the section being taken substantially in the transverse vertical plane bisecting the group as indicated by the line 2—2 of Figure 1.

Figure 6 is a top plan view.

Figure 3:
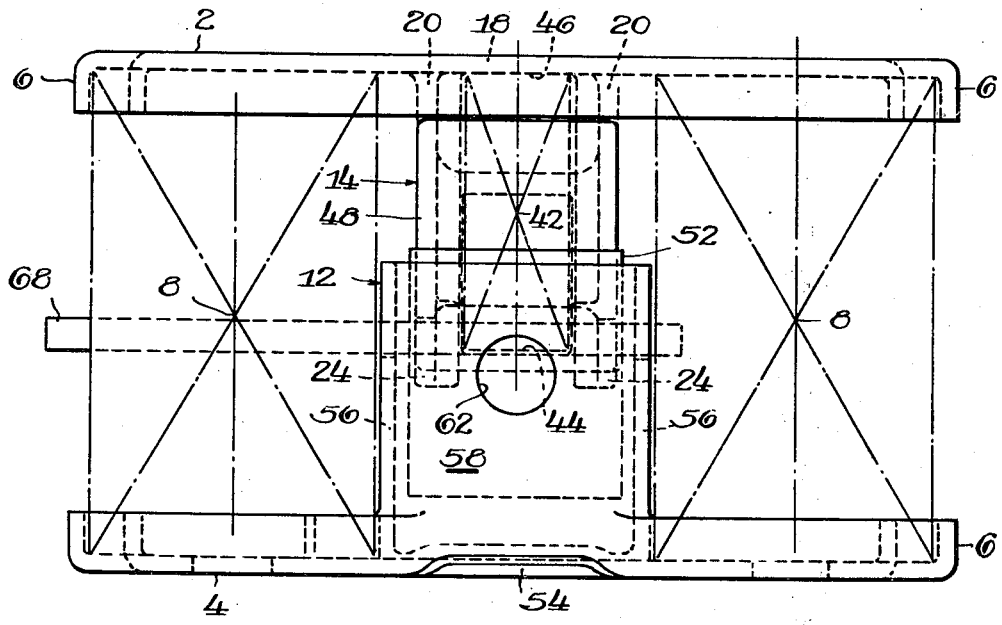
Figure 3 is a side view of said structure.

Describing the structure in detail, my novel spring group arrangement may comprise a top spring plate 2, a bottom spring plate 4, both of said plates being formed with scalloplike inturned flanges 6, 6 of well known form, said flanges serving as positioning means for the interposed long travel coil springs diagrammatically indicated at 8, 8 interposed between said plates and arranged in pairs at the front and rear of said group. Between the front and rear pairs of coil springs 8, 8 is positioned my novel friction device comprising a top follower 10, a bottom follower or housing 12, and a pair of spaced identical friction shoes 14, 14.

The top follower 10 is a hollow skeletal structure having the top wall 18 thereof merging with and formed as an integral portion of the spring plate 2. Spaced substantially parallel side walls 20, 20 of hourglass form depend from said top wall 18 and are connected intermediate the ends thereof by a central wall 22 extending therebetween and merging therewith. As best seen in Figure 2, each of the side walls 20, 20 is formed at opposite ends thereof with reversely arranged diagonal surfaces 24 and 26 converging toward the top wall 18, the surfaces 24, 24 of the walls 20, 20 being coplanar with respect to each other and the surfaces 26, 26 of the walls 20, 20 also being coplanar with respect to each other, said walls 20, 20 receiving therebetween at opposite ends thereof the friction shoes 14, 14, one of said shoes having complementary engagement as at 28 with the surfaces 24, 24 and the other of said shoes having complementary engagement as at 30 with the surfaces 26, 26.

Figure 6:
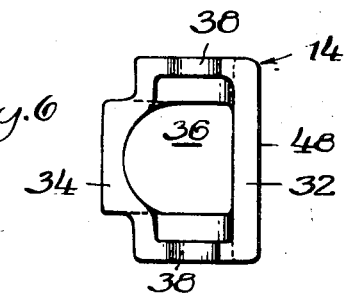
Figures 4, 5 and 6 are views illustrating one of the identical friction shoes utilized in the structure shown in Figures 1, 2 and 3, Figure 4 being a side elevation thereof, Figure 5 a view looking toward the left of Figure 4.
Figure 5:
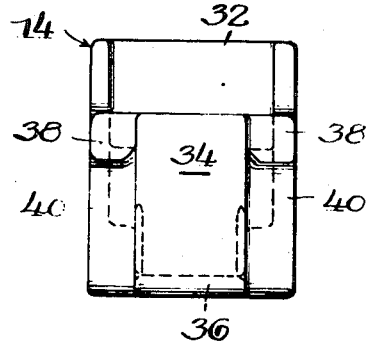
Figure 4:
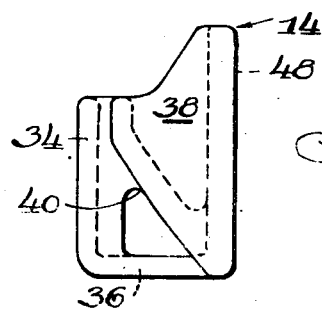

Referring now to Figure 2, and also to Figures 4, 5 and 6 showing one of the identical friction shoes in detail, each shoe is a cuplike structure comprising a front friction wall 32, a rear wall 34, a bottom wall 36, and lateral walls 38, 38, said lateral walls 38, 38 being formed to provide wing portions or ledges presenting on the bottoms thereof coplanar diagonal surfaces 40, 40 the surfaces 40, 40 of one of said shoes being engageable as aforesaid as at 28 with the surfaces 24, 24 of the top follower, and the surfaces 40, 40 of the other of said shoes having engagement as at 30 with the surfaces 26, 26 of the top follower. The shoes are urged into the aforesaid engagements by vertical coil springs 42, 42 received within respective shoes and positioned therein by the surrounding walls of the shoes, each spring 42 being seated as at 44 against the bottom wall 36 of the associated shoe and extending between the walls 20, 20 of the top follower and being seated as at 46 against the top wall 18 of the top follower, said springs 42, 42 urging said shoes into engagement with the diagonal surfaces of the top follower and along said surfaces outwardly and downwardly to engage the friction surface 48 of the friction wall 32 of each shoe as at 50 with the adjacent wear plate 52 on the bottom follower. It may be noted from a consideration of Figures 1 and 2 that each of the walls 20, 20 of the top follower are formed at each end thereof with inwardly turned flanges 53, 53 to increase the bearing area of the wedge surfaces 24, 24 and 26, 26 of the top follower.

The bottom follower or housing, in telescoping relationship with the top follower 10, is a rectangular boxlike structure having the bottom wall 54 thereof formed as an integral portion of the spring plate 4 and having the spaced lateral walls 56 and end walls 58, 58, said end walls having secured thereto the friction plates 52, 52 by welding each plate as at 60, 60 to the margins of an opening 62 in the associated end wall 58.

From the foregoing it will be apparent that the friction shoes will be urged along the wedge surfaces of the top follower by the springs compressed between the shoes and the top follower and into engagement with the friction plates on the bottom follower in such manner as to afford substantially constant frictional control of the oscillations of the springs 6, 6 under service conditions.

In the assembly of the spring group, each shoe may have positioned therein the associated spring 44 and thereafter the shoes may be received between the side walls 20, 20 of the top follower at opposite ends thereof for engagement of the wing portions of the shoes with the wedge or diagonal surfaces of the follower. The shoes may then be urged toward each other by means of a clamping piece (not shown) to permit convenient reception of the assembly within the bottom follower and the assembly may then be positioned within the bottom follower and the clamping piece removed. As previously pointed out, the spring group utilizes long travel coil springs 8, 8 which may increase the height of the spring group to an extent preventing the insertion of the same within the limited space afforded between two relatively movable supporting and supported members, such as a bolster and side frame of a railway car truck. To permit the insertion of the spring group between these members, the height of the spring group may be decreased by compressing the springs 6, 6, prior to assembly with the truck, to bring the openings 64, 64 in the lateral walls 56, 56 of the bottom follower into alignment with the openings 66, 66 in the lateral walls 20, 20 of the top follower, whereupon a bar 68 may be inserted within said openings to maintain the spring group height within the limits permitting its ready assembly with the car truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A spring group comprising spaced top and bottom spring plates, a plurality of springs therebetween, and a friction device in parallel with said springs comprising a follower integrally formed with one plate and presenting opposed friction surfaces, spaced side walls integrally formed with the other plate, each side wall having a portion tapering from the top thereof and another portion tapering from the bottom thereof to connect with the first-mentioned portion, the portion of each side wall remote from said other plate having wedge faces sloping toward respective surfaces, a friction shoe at each end of the device disposed between said side walls in guiding engagement therewith, said shoe being in wedge engagement with the associated faces and in frictional engagement with the associated surfaces, and spring means bearing against said other plate and against a portion of the shoe for actuation of the latter.

2. A spring group comprising spaced spring plates, a plurality of springs confined therebetween, and a friction device in parallel with said springs, said device including spaced friction surfaces on one of said plates at respective ends of the device, spaced side walls connected to the other plate, each of said side walls being generally of hourglass shape and having the ends thereof tapering from said other plate and then flaring toward respective surfaces to afford wedge faces on said ends, friction shoes at the ends of the device engaging the associated faces and surfaces, said shoes being confined between said side walls in guiding engagement therewith, and spring means extending between said side walls and bearing against said other plate and said shoes for actuation of the latter.

3. A spring group comprising spaced spring plates, a plurality of springs confined therebetween, and a friction device in parallel with said springs, said device including a follower with spaced friction surfaces on one of said plates at respective ends of the device, spaced side walls connected to the other plate, each of said side walls being generally of hourglass shape and having the ends thereof tapering from said other plate and then flaring toward said surfaces to afford wedge faces on the flared portion of said ends, friction shoes at the ends of the device confined between said side walls and engaging the associated faces and surfaces, spring means extending between said side walls and bearing against said other plate and said shoes for actuation of the latter, aligned openings through the flared portions of said side walls, and corresponding openings through said follower adapted to be registered with the first-mentioned openings in a compressed position of said group, said openings being formed and arranged for reception of an associated retainer bar to retain said group in said position during assembly and disassembly of said group with an associated railway car truck.

4. A spring group comprising spaced spring plates, a plurality of springs confined therebetween, and a friction device in parallel with said springs, said device including spaced friction surfaces on one of said plates, spaced side walls connected to the other plate and extending lengthwise of the device between said surfaces, each of said side walls having portions of its opposite ends sloping away from said other plate toward respective surfaces to define sloping wedge faces, friction shoe means at each end of the device confined between said side walls in guiding engagement therewith and in wedge engagement with the associated faces and in frictional engagement with the associated surface, and spring means extending between said side walls and bearing directly against said other plate and said friction shoe means for actuation of the latter.

5. A spring group comprising spaced spring plates, a plurality of springs confined therebetween, and a friction device in parallel with said springs, said device including spaced friction surfaces on one of said plates at respective ends of the device, spaced side walls connected to the other plate and extending lengthwise of the device between said surfaces, each of said side walls having a portion tapering in width toward said other plate to afford wedge faces on the ends of said side walls sloping away from respective surfaces toward said other plate, a friction shoe at each end of the device confined between said side walls for guidable engagement therewith, said shoe having spaced ledges in complementary wedge engagement with the associated faces and having a portion in friction engagement with the associated surface, and an actuating spring extending between said side walls and said ledges, bearing against a portion of said other plate and housed within said shoe in engagement therewith for actuation of the latter.

FRED E. BACHMAN.

REFERENCES CITED

The following references are of record in the file of this patent:

UNITED STATES PATENTS

| Number | Name | Date |
| --- | --- | --- |
| 1,301,946 | Johnson | Apr. 29, 1919 |
| 1,862,766 | O'Connor | June 14, 1932 |
| 2,118,006 | Couch | May 17, 1938 |
| 2,378,414 | Light | June 19, 1945 |
| 2,378,415 | Light | June 19, 1945 |
| 2,398,751 | Light | Apr. 16, 1946 |